Feb. 28, 1950     P. H. HOWE     2,499,098
MACHINE FOR TRIMMING HORSES' FEET
Filed Sept. 5, 1946
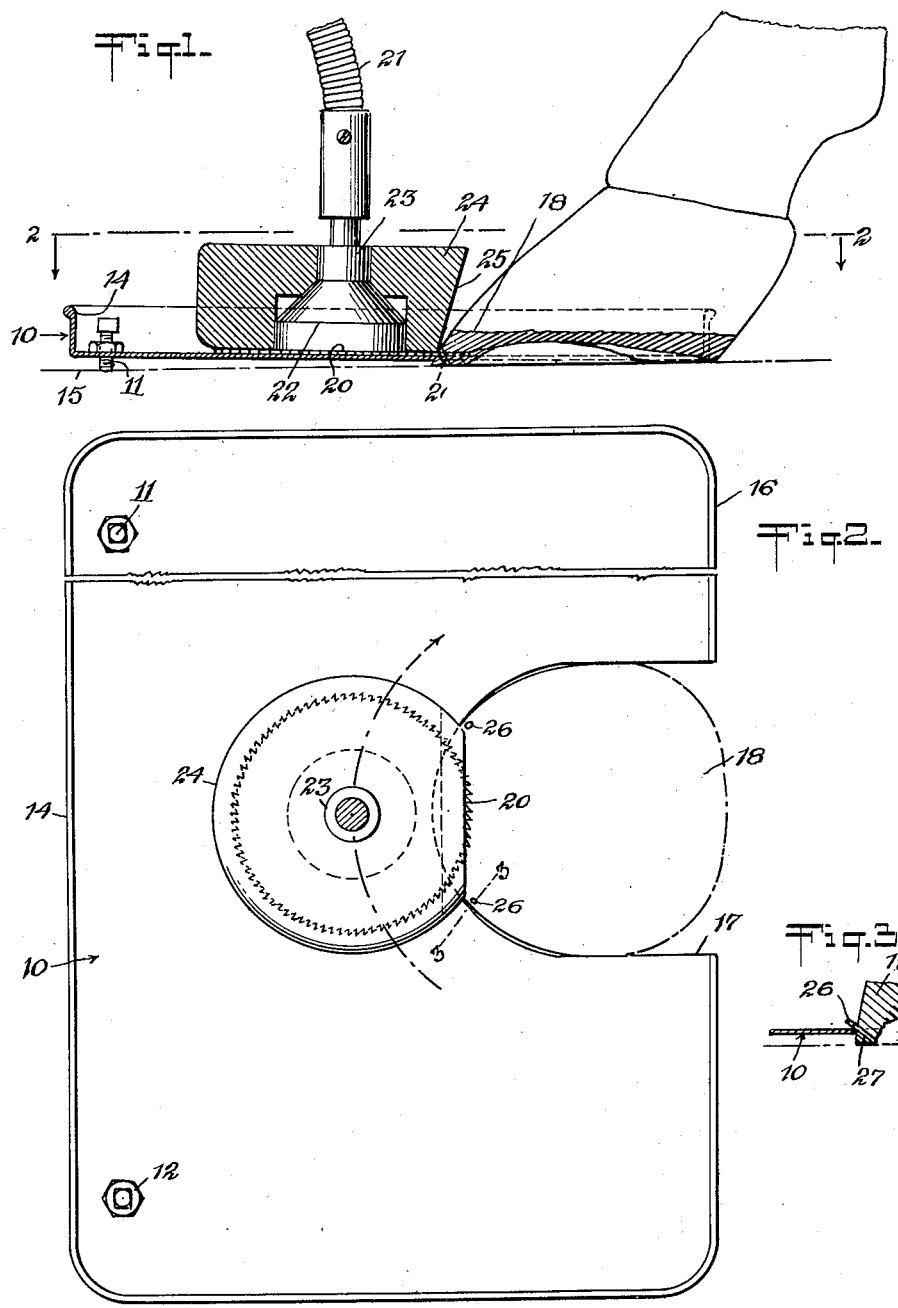
INVENTOR
*Patrick H. Howe*
BY
*Munn, Liddy & Glaccum*
ATTORNEYS Patented Feb. 28, 1950

2,499,098

UNITED STATES PATENT OFFICE 2,499,098

MACHINE FOR TRIMMING HORSES' FEET

Patrick H. Howe, Jamaica, N. Y.

Application September 5, 1946, Serial No. 694,952

1 Claim. (Cl. 168—48)

This invention relates to the art of horseshoeing and more particularly to the preparation of the foot to receive the shoe. It is highly important, especially in the shoeing of race horses, that the foot be cut properly to receive the shoe and to be sure that the foot after preparation is smooth and regular. In the ordinary shoeing of horses it is customary to cut the sole with a shoeing knife and then to rasp it smooth. A certain portion of the bars and sole is also cut away when necessary. The wall of the foot is hard and will cut cleanly while the sole is soft and tends to be spongy. In the past, some attempts have been made to cut by automatic means the hoof in preparation for shoeing. However, if the cutting device cuts through the wall into the sole there is danger of injury to the hoof and at the same time the material of which the sole consists is so gummy that the cutting instrument may be fouled and ineffective.

An object of this invention is to provide a device for cutting the sole of a foot cleanly and evenly without cutting into the sole and without unduly exciting the animal or requiring him to be put into an awkward position. It is well known that many horses, particularly race horses, run better when their feet are cut so that the slope at the toe is at a predetermined angle to the ground. This angle is usually less at the rear feet than at the front feet. An object of the present invention is to provide a method and apparatus by which a foot may be cut at any predetermined angle so that when shod the horse will stand with the slope of the toe at the desired angle to the ground.

A further object is to provide a means whereby less experienced shoers may avoid errors of judgment as well as slips of the knife and thus prevent serious injury or temporary damage to the foot.

Other objects and advantages of my method become apparent as the description proceeds.

Fig. 1 is a view partly in cross section of my device in operation.

Fig. 2 is a plan view on the line 2—2 of Fig. 1.

Fig. 3 is a detailed view showing a method of indicating the proper cutting line.

In preparing the hoof for cutting a convenient method of determining the amount of wall to be cut is to examine the foot and determine the growth of the sole beyond the wall. A hole then can be punched from the inside through the wall parallel to the sole. This would be the normal cutting line and may be indicated on the outside by a small peg if desired. However, the cut from the toe rearwardly will vary in accordance with the angle desired for best results. I, accordingly, provide an adjustable platform upon which the cutting implement rests. This platform can be adjusted to place the cutting instrument or knife at the proper angle. A platform is provided with a cut-out to surround the hoof and to allow the horse's hoof to be placed on the floor. If necessary, the opposite foot can be raised in order to keep the animal quiet.

Referring more particularly to the drawings—

I provide an adjustable platform 10 having adjustable screws 11 and 12 to determine the height of the edge 14 from the floor 15. The opposite edge 16 of the platform 10 is provided with a recess 17 to accommodate the foot 18 of the horse. A circular saw or other cutting implement 20 is mounted on a flexible shaft 21 leading to a suitable source of power. Mounted loosely on the saw block 22 around the collar 23 is a guard 24 which will allow the plate 20 only a limited cut. The guard 24 has a sloping face 25 so that it will engage the hoof properly at its steepest portion. The angle of the cut may be determined, as heretofore stated, by placing a peg 26 through a hole 27 in the wall or may be measured by a compass or other instrument. The horse's foot is then placed in the recess 17 and the blade 20 rotated around the foot to cut off smoothly and evenly that portion of the wall which is to be removed. Any portion of the sole which is to be taken out can then be removed with a cutting knife without touching the walls, thus leaving a flat, cleanly cut wall for the reception of the shoe. This eliminates the danger and tendency of a shoer to cut away the wall on a bevel with the sole and thus not leave sufficient flat wall to receive the shoe and the nails.

I claim:

A device for cutting the wall of a horse's foot, including a platform having a portion thereof to surround the horse's foot, means at the front end of said platform to adjust the angle of said platform with relation to the floor, a rotating blade positioned on said platform to cut the wall of the horse's foot, a guard member mounted with relation to said platform to limit the depth of its cut, said guard blade being rotatable so that the blade may be moved around the foot.

PATRICK H. HOWE.

REFERENCES CITED

The following references are of record in the file of this patent:

UNITED STATES PATENTS

| Number | Name | Date |
|---|---|---|
| 6,983 | Crafts | Jan. 1, 1850 |
| 217,642 | Schaefer | July 15, 1879 |
| 768,366 | Hughes | Aug. 23, 1904 |
| 833,787 | Johnson | Oct. 23, 1906 |
| 926,101 | Connet | June 29, 1909 |
| 989,793 | Morris | Apr. 18, 1911 |
| 1,000,821 | Krickel | Aug. 15, 1911 |
| 1,083,160 | Villinger | Dec. 30, 1913 |
| 1,439,009 | Littlefield | Dec. 19, 1922 |
| 1,716,662 | Pedley | June 11, 1929 |